(12) United States Patent
Beneker et al.

(10) Patent No.: US 8,967,580 B2
(45) Date of Patent: Mar. 3, 2015

(54) SEAT BASE FRAME FOR A MOTOR VEHICLE SEAT

(75) Inventors: Wilfried Beneker, Leichlingen (DE); Andre Dick, Solingen (DE); Toralf Müller, Leverkusen (DE); Stephan Springenberg, Wülfrath (DE); Dirk Hanisch, Köln (DE)

(73) Assignee: C. Rob. Hammerstein GmbH & Co. KG, Solingen (DE)

( * ) Notice: Subject to any disclaimer, the term of this patent is extended or adjusted under 35 U.S.C. 154(b) by 95 days.

(21) Appl. No.: 13/696,050

(22) PCT Filed: Apr. 29, 2011

(86) PCT No.: PCT/EP2011/056866
§ 371 (c)(1),
(2), (4) Date: Jan. 10, 2013

(87) PCT Pub. No.: WO2011/138249
PCT Pub. Date: Nov. 10, 2011

(65) Prior Publication Data
US 2013/0200675 A1  Aug. 8, 2013

(30) Foreign Application Priority Data

May 5, 2010  (DE) .......................... 10 2010 028 630

(51) Int. Cl.
*F16M 13/00* (2006.01)
*B60N 2/12* (2006.01)
(Continued)

(52) U.S. Cl.
CPC ................ *B60N 2/12* (2013.01); *B60N 2/0228* (2013.01); *B60N 2/06* (2013.01); *B60N 2/07* (2013.01);

(Continued)

(58) Field of Classification Search
USPC .................. 248/419, 423, 429, 421; 297/341, 297/344.1, 344.15
See application file for complete search history.

(56) References Cited

U.S. PATENT DOCUMENTS 3,460,793 A * 8/1969 Posh .............................. 248/394
3,700,203 A * 10/1972 Adams ......................... 248/419
(Continued)

FOREIGN PATENT DOCUMENTS

DE    29814 44 9 U1    11/1998
DE    19827 06 8 C1    9/1999
(Continued)

OTHER PUBLICATIONS

International Search Report dated Jul. 28, 2011 as received in the corresponding PCT application, PCT/EP2011/056866.
(Continued)

*Primary Examiner* — Bradley Duckworth
(74) *Attorney, Agent, or Firm* — Foley & Lardner LLP (57) ABSTRACT

A seat base frame has pairs of tracks, each having an upper rail longitudinally displaceably guided relative to a lower rail and lockable by means of a locking device on the lower rail. A seat structure is connected to the upper rails, and a transverse support extends substantially perpendicular to the upper rails and is connected thereto. The transverse support is fixed in the axial direction thereof relative to the upper rails and rotatably connected thereto, wherein an actuating lever and a control lever are disposed rotationally fixed relative to each other and spaced apart from each other on the transverse support such that each can be engaged by a locking device for adjusting the locking device between a locked position fixing the upper rail relative to the lower rail and a release position releasing the upper rail relative to the lower rail.

12 Claims, 7 Drawing Sheets

(51) Int. Cl.
*B60N 2/02* (2006.01)
*B60N 2/06* (2006.01)
*B60N 2/07* (2006.01)
*B60N 2/08* (2006.01)
*B60N 2/16* (2006.01)

(52) U.S. Cl.
CPC ............ *B60N 2/0881* (2013.01); *B60N 2/1615* (2013.01); *B60N 2/08* (2013.01); *B60N 2/16* (2013.01)
USPC .......................... 248/423; 248/429; 297/344.1

(56) References Cited

U.S. PATENT DOCUMENTS

| | | | | |
|---|---|---|---|---|
| 4,043,529 | A * | 8/1977 | Pickles | 248/419 |
| 4,775,126 | A * | 10/1988 | Yokoyama | 248/430 |
| 4,813,643 | A * | 3/1989 | Nihei | 248/430 |
| 5,483,853 | A * | 1/1996 | Moradell et al. | 74/665 GD |
| 5,568,908 | A * | 10/1996 | Kisiel | 248/419 |
| 6,264,274 | B1 * | 7/2001 | Frohnhaus et al. | 297/313 |
| 6,299,252 | B1 | 10/2001 | Frohnhaus et al. | |
| 6,921,058 | B2 * | 7/2005 | Becker et al. | 248/419 |
| 7,222,918 | B2 * | 5/2007 | Bronner et al. | 297/341 |
| 7,604,213 | B2 * | 10/2009 | Choi et al. | 248/419 |
| 7,770,863 | B2 * | 8/2010 | Yamada et al. | 248/429 |
| 2003/0160483 | A1 * | 8/2003 | Becker et al. | 297/216.16 |
| 2006/0181129 | A1 | 8/2006 | Bronner et al. | |
| 2007/0095596 | A1 * | 5/2007 | Beneker et al. | 180/326 |
| 2007/0170769 | A1 * | 7/2007 | Beneker et al. | 297/468 |
| 2008/0179932 | A1 * | 7/2008 | Becker et al. | 297/367 |
| 2010/0213341 | A1 * | 8/2010 | Beneker et al. | 248/419 |
| 2011/0163585 | A1 * | 7/2011 | Beneker et al. | 297/344.15 |
| 2012/0248840 | A1 * | 10/2012 | Becker et al. | 297/344.1 |
| 2013/0306825 | A1 * | 11/2013 | Brodersen | 248/419 |

FOREIGN PATENT DOCUMENTS

| | | |
|---|---|---|
| DE | 10 2005 039 90 3 B3 | 12/2006 |
| DE | 10 2006 043 75 9 A1 | 3/2008 |
| DE | 10 2007 018 10 1 A1 | 10/2008 |
| DE | 10 2007 049 06 7 B3 | 1/2009 |
| DE | 10 2007 059 37 1 A1 | 6/2009 |
| FR | 2883521 A1 | 9/2006 |
| WO | WO-2010/020567 A1 | 2/2010 |

OTHER PUBLICATIONS

English translation of the International Preliminary Report on Patentability received in connection with international application No. PCT/EP2011/056866 dtd Nov. 15, 2015.

* cited by examiner

SEAT BASE FRAME FOR A MOTOR VEHICLE SEAT

CROSS REFERENCE TO RELATED APPLICATIONS

The present application is a National Stage of International Application No. PCT/EP2011/056866 filed on Apr. 29, 2011, which claims the benefit of German Patent Application No. 10 2010 028 630.3 filed on May 5, 2010, the entire disclosures of which are incorporated herein by reference.

The invention relates to a seat base frame for a motor vehicle seat with
- pairs of tracks disposed in parallel spaced apart from each other
  - each having an upper rail longitudinally displaceably guided relative to a lower rail and lockable by means of a locking device on the lower rail,
- a seat structure, connected to the upper rails and
- a transverse support extending substantially perpendicular to the upper rails and connected thereto.

Seat base frames of the initially named type are known in various designs from the state of the art. They generally permit a longitudinal adjustment of a seat structure connected with the seat base frame after a manual actuation of the locking device, wherein the upper rails connected with the seat structure can be displaced relative to the floor-fixed, i.e. fastened on the vehicle floor, lower rails. The locking devices thereby allow a releasable locking of the upper rail on the lower rail and thus of the seat structure with respect to the lower rail in the selected longitudinal setting of the motor vehicle seat.

In particular, such seat base frames—but not restricted to these—the seat structure of which, for example a seat pan, is arranged asymmetrically with respect to the pairs of tracks, i.e. in which the seat structure of the vehicle seat in the installation position with respect to the seat rails is arranged displaced in the direction of the vehicle outside or the center of the vehicle, require the use of a transverse support extending between the upper rails and ensuring the required strength. It serves to reinforce the seat base frame, wherein in particular the asymmetrical arrangement of the seat structure, with respect to the pairs of tracks with the mounting points then progressing offset with respect to the upper rails towards the center or exterior of the vehicle, with the seat structure causes a torque, which leads in particular in the event of a crash to an increased load on the seat base frame with the risk of its collapse.

In order to enable a longitudinal displaceability, i.e. a displacing of the upper rail with respect to the lower rail, it is also required to provide an actuation means, which allows operation of the locking device so that it is movable out of a locked position fixing the upper rail to the lower rail into a release position releasing the upper rail, in which the upper rail can be displaced with respect to the lower rail. After the locking device is normally arranged on both pairs of tracks, a transfer means, e.g. a transfer shaft, is then also required, which enables a transfer of the actuation to both locking devices.

Known seat base frames with a transverse support for stabilization as well as an actuation shaft for operating the locking device have the disadvantage that they require increased installation space. Moreover, the higher number of parts causes higher production costs for such seat base frames.

The object of the invention is to provide a seat base frame, which requires less installation space with sufficient strength and actuation capability of the locking devices.

The object of the invention is achieved through a seat base frame with the characteristics of claim 1. Advantageous further embodiments of the invention are specified in the dependent claims.

Characteristic of the seat base frame according to the invention is that the transverse support fixes the pairs of tracks in a crash-stable manner against each other supportingly in its axial direction with respect to the upper rails, but is at the same time rotatably connected with it. The axial fixation of the transverse support with respect to the upper rails ensures a reliable support of the pairs of tracks with respect to each other and thus a high strength of the seat base frame. A collapse of the seat base frame, in particular in the event of a crash, as a result of a movement of the pairs of tracks towards each other, in particular in the installation position on the vehicle diagonal to the vehicle direction, is hereby reliably prevented.

The additionally existing twistability of the transverse support like a shaft enables its simultaneous use to actuate the locking device fixing the upper rail with respect to the lower rail in the direction of the longitudinal axis of the pairs of tracks. For this, an actuating lever and a control lever are arranged on the transverse support at a distance from each other in a twist-proof manner and are each engageable with a locking device of a pair of tracks. A normally manual actuation of the actuating lever, which extends beyond the transverse support into an engagement area with a locking device and in which the actuating lever is raised as a rule, leads to a twisting of the transverse support such that the end of the actuating lever facing the locking device and the control lever, which extends in the area of the end of the transverse support lying opposite the actuating lever from the transverse support up to into the engagement area of the opposite-lying locking device, move the locking devices out of their locked positions and into their release positions, so that a longitudinal displaceability of the upper rail with respect to the lower rail is possible.

The embodiment according to the invention thus makes it possible to forgo additional transfer means for the adjustment of the locking devices in the case of a desired longitudinal adjustment. The transverse support according to the invention fulfills for one a support function stabilizing the seat base frame and it also enables the actuation of the locking devices. Additional, cost-increasing actuation elements or respectively stabilizing support elements can thus be foregone. The seat base frame according to the invention can thus be produced in a particularly easy and cost-effective manner and only needs little installation space in the area between the pairs of tracks.

In its simplest embodiment of the invention, a seat structure, for example a seat pan, is connected directly with the upper rails, which enables the production of a particularly cost-effective vehicle seat, which however does not offer the option of a seat height adjustment as a rule. According to a particularly advantageous embodiment of the invention, a front and/or a rear mounting linkage are arranged in a jointed manner on the upper rail. This further embodiment of the invention enables an adjustable or respectively pivotable arrangement of the seat structure with respect to the upper rails, which is connected for this in a jointed manner with the mounting linkages, preferably in an area facing away from the upper rails. A pivoting of the mounting linkages with respect to the seat upper rails then leads to a distance change of the seat structure, for example of the seat pan with respect to the upper rails and thus improves the adjustment capabilities of a vehicle seat connected with this seat base frame.

In accordance with a further embodiment of the invention, each front and/or rear mounting linkage is connected in a jointed manner with a mounting linkage holder arranged on the upper rail. The use of a mounting linkage holder, or respectively several mounting linkage holders, which are arranged on the upper rail and connected in a jointed manner with a mounting linkage, increases the application area of the seat base frame, after which hereby also an asymmetrical arrangement of a seat structure with respect to the upper rails is possible according to a particularly preferred further embodiment. The mounting linkage holders can thereby have a bent shape, which displaces the connection point of the mounting linkage with the associated mounting linkage holder with respect to the pair of tracks either towards each other or away from each other. Moreover, the mounting linkage holders have the advantage that they can be easily arranged on the upper rail, for example through welding, such that the jointed connection can be realized at a distance from the upper rail. An adjustment of the upper rail for arrangement of the seat structure or of mounting linkages is not required.

In the case of the use of mounting linkage holders, it is further provided according to a particularly advantageous further embodiment of the invention that the transverse support is connected fixed in the axial direction and twistably on the end side with two oppositely arranged mounting linkage holders, preferably front mounting linkage holders. In this case, the mounting linkage holders do not just serve to receive the mounting linkages in a jointed manner, but rather also fulfill the function of the twistable and axially fixed receiving of the transverse support. The use of the mounting linkage holders for receiving the transverse support thereby facilitates in a special manner the fixation of the transverse supports, since a corresponding design of the upper rails can be foregone. Moreover, the mounting linkage holder in the contact area with the transverse support can be adjusted in a special manner so that a particularly reliable installation of the transverse support is guaranteed.

As already explained above, in a simplest embodiment of the invention, a seat structure is directly connected with the upper rails. In the case of the use of mounting linkages provided according to an advantageous further embodiment, it is provided according to a particularly advantageous embodiment of the invention that the mounting linkages of the door-side and vehicle-center pairs of tracks have a differing geometry, in particular such that the seat structure, in particular a seat pan, is arranged asymmetrically to the pairs of tracks. The use of mounting linkages enables, for example due to the fact that the mounting linkages of the two pairs of tracks are bent differently from each other, that the hinge points of the mounting linkage with the upper rail or respectively a mounting linkage holder are displaced with respect to the hinge points of the mounting linkages with the seat structure, in particular a seat pan, with respect to a plane, which progresses perpendicular to a plane formed by the pairs of tracks, substantially parallel to the vehicle floor. This design, leading to an asymmetrical alignment of the seat structure with respect to the rails, makes it possible to optimally adjust the vehicle seats to the specifications required by the vehicle manufacturers, wherein increasingly an arrangement offset with respect to the pairs of tracks is required, which causes a door-side or vehicle-center-aligned displacement of the seat structure with respect to the pairs of tracks.

In particular in the case of the asymmetrical alignment of the seat structure with respect to the pairs of tracks, the fixation of the transverse support that occurred in the axial direction of the transverse support with respect to the upper rails or respectively the mounting linkage holders, guarantees a particular strength of the seat base frame, which also effectively prevents a collapse of the seat base frame in the case of loads occurring in the event of a crash.

In addition to the advantageously provided embodiment of the invention, whereby the mounting linkage of at least one seat rail, preferably both mounting linkages of a seat rail, have a door-side or vehicle-center-aligned bend, which lead to an asymmetrical arrangement of the seat structure, a supplementary displacement of the seat structure with respect to the pairs of tracks can furthermore also be achieved through the use of bent mounting linkage holders.

In accordance with a further embodiment of the invention, at least one front mounting linkage can be brought to engage with the transverse support. In accordance with this further embodiment of the invention, the mounting linkage can come into contact with the transverse support as a result of a height adjustment of the seat structure with respect to the pairs of tracks. A maximum lowering position of the seat structure with respect to the seat base frame can hereby be defined. Moreover, this embodiment of the invention prevents the sagging of the seat structure in the event of a crash so that the supplementary safety systems like the seat belt and the airbag can reliably deploy.

Particularly advantageously, the front mounting linkage engageable with the transverse support thereby has a contact surface adjusted for the contour of the transverse support. It is hereby ensured in the case of contact, for example in the event of a crash, that there is no selectively acting load on the transverse support, but rather a two-dimensional application, which ensures a particularly good transfer of force from the mounting linkage to the transverse support.

The transverse support can generally be designed in any manner as long as it is guaranteed that it is supported in the direction of its longitudinal axis axially on the upper rails and is also pivot-mounted with respect to it, wherein the pivotability enables a transfer of an adjustment movement acting on the actuating lever towards the locking device. In accordance with a particularly advantageous embodiment of the invention, the transverse support is however formed by a cross tube, which can have various shapes, profilings, constrictions or the like. It can be fixed in a particularly simple manner in the axial direction or can be arranged rotatably on the upper rail or respectively a mounting linkage holder. The cross tube also has a particular strength regardless of the load direction.

In accordance with a particularly advantageous further embodiment of the invention, the cross tube thereby rests through end-side front surfaces on the upper rails, in particular on facing inner surfaces of the front mounting linkage supports. A corresponding embodiment of the invention, in which the cross tube with its front surfaces is supported directly on the upper rails or respectively on facing surfaces of the mounting linkage supports, guarantees in a particularly reliable manner a fixation occurring in the longitudinal axis direction of the cross tube with respect to the pairs of tracks.

In accordance with a further embodiment of the invention, each actuating lever and control lever engageable with a locking device is welded, in particular laser-welded, to the transverse support, in particular the cross tube. In the case of a longitudinal adjustment of the upper rail with respect to the lower rail to take place, an operator normally raises the actuating lever in the area of its end, which causes a twisting movement of the transverse support. As a result of the twisting movement of the transverse support, an end of the actuating lever extending over the transverse support from the actuating handle and a control lever arranged in the opposite area of the transverse support each engage with an actuating element of the locking device and push it beyond a position, in which the locking device causes a fixation of the upper rail on the lower rail. While the arrangement of the actuating lever and the control lever is mainly freely selectable, according to this advantageous further embodiment of the invention, a welded connection, in particular a laser-welded connection, is however preferred, which guarantees in a reliable manner a twist-proof connection of the actuating lever and control lever with the transverse support.

An exemplary embodiment of the invention is explained in greater detail below based on drawings. In the figures.

Figure 1:
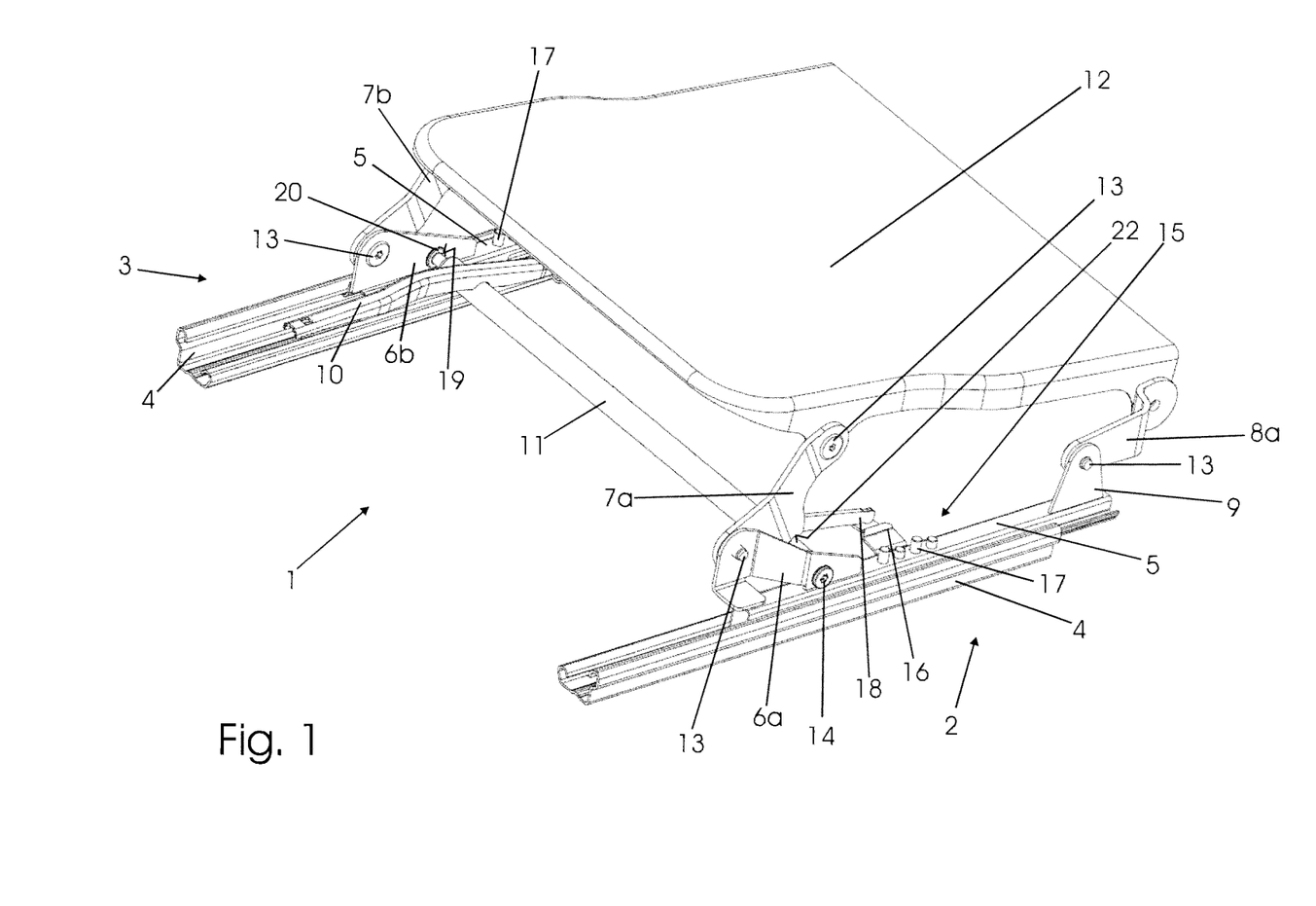
FIG. 1 shows a perspective view of a seat base frame.
Figure 2:
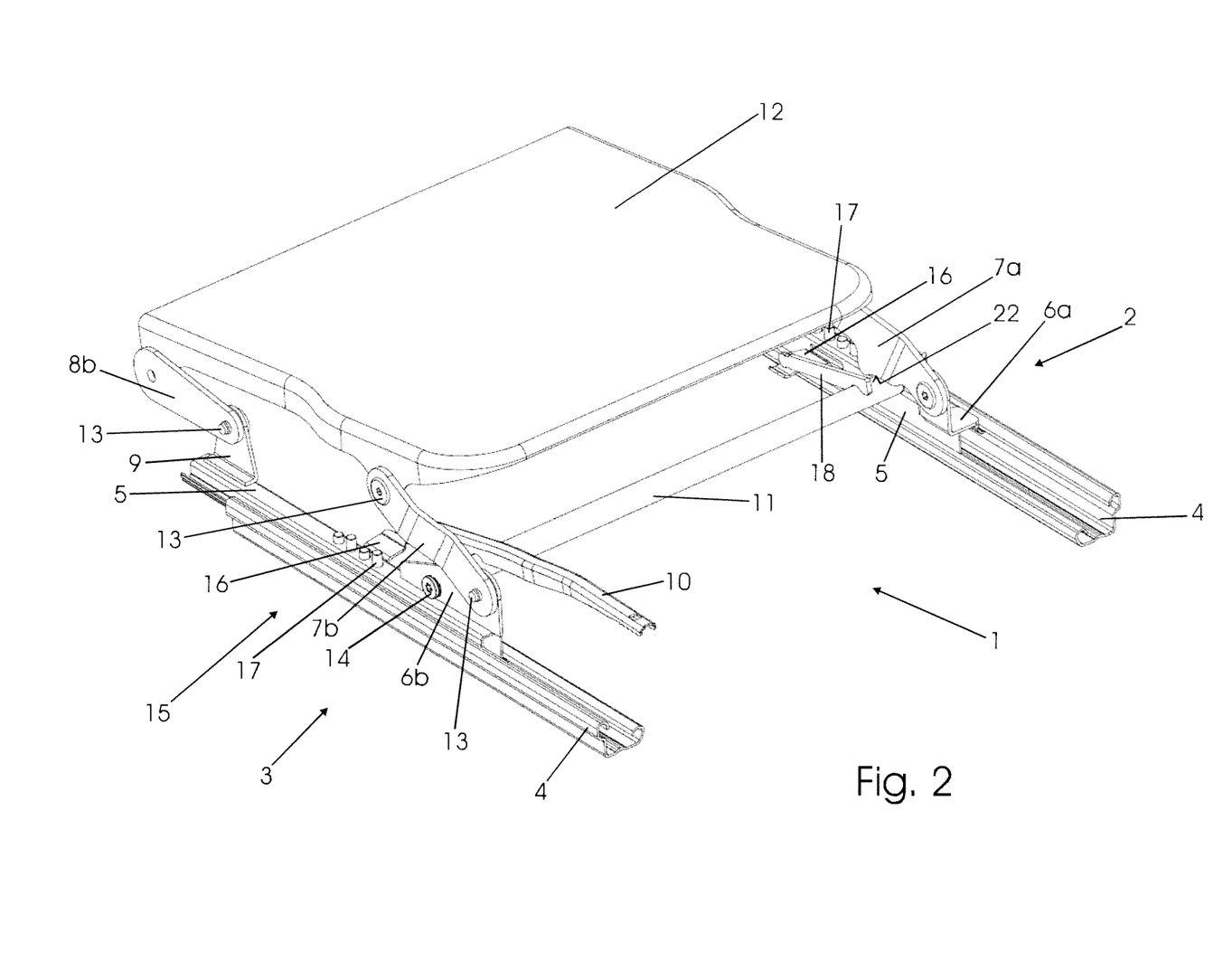
FIG. 2 shows a further perspective view of the seat base frame in FIG. 1.

FIGS. 1 and 2 show a perspective view of an embodiment of a seat base frame 1, in which two pairs of tracks, a door-side pair of tracks 2 and a tunnel-side pair of tracks 3 are interconnected via a seat structure designed as the seat surface 12.

The pairs of tracks 2, 3 each have a lower rail 4 arrangeable on a vehicle floor (not shown here) as well as an upper rail 5 displaceably mounted in the lower rail 4. The longitudinal displaceability of the upper rail 5 with respect to the lower rail 4 enables a longitudinal adjustment of the seat surface 12 in the vehicle. For the connection of the seat surface 12 with the displaceable upper rails 5, two mounting linkages 7a, 7b, 8a, 8b are thereby connected on both sides of the seat surface 12 on one end in a jointed manner with the seat surface 12 via mounting bolts 13 and on the other end in a jointed manner with mounting linkage holders 6a, 6b, 9 arranged on the upper rails 5, also via mounting bolts 13. These jointed connections of the upper rails 5 with the seat surface 12 enable a height adjustment of the seat surface 12 with respect to the pairs of tracks 2, 3.

Figure 4:
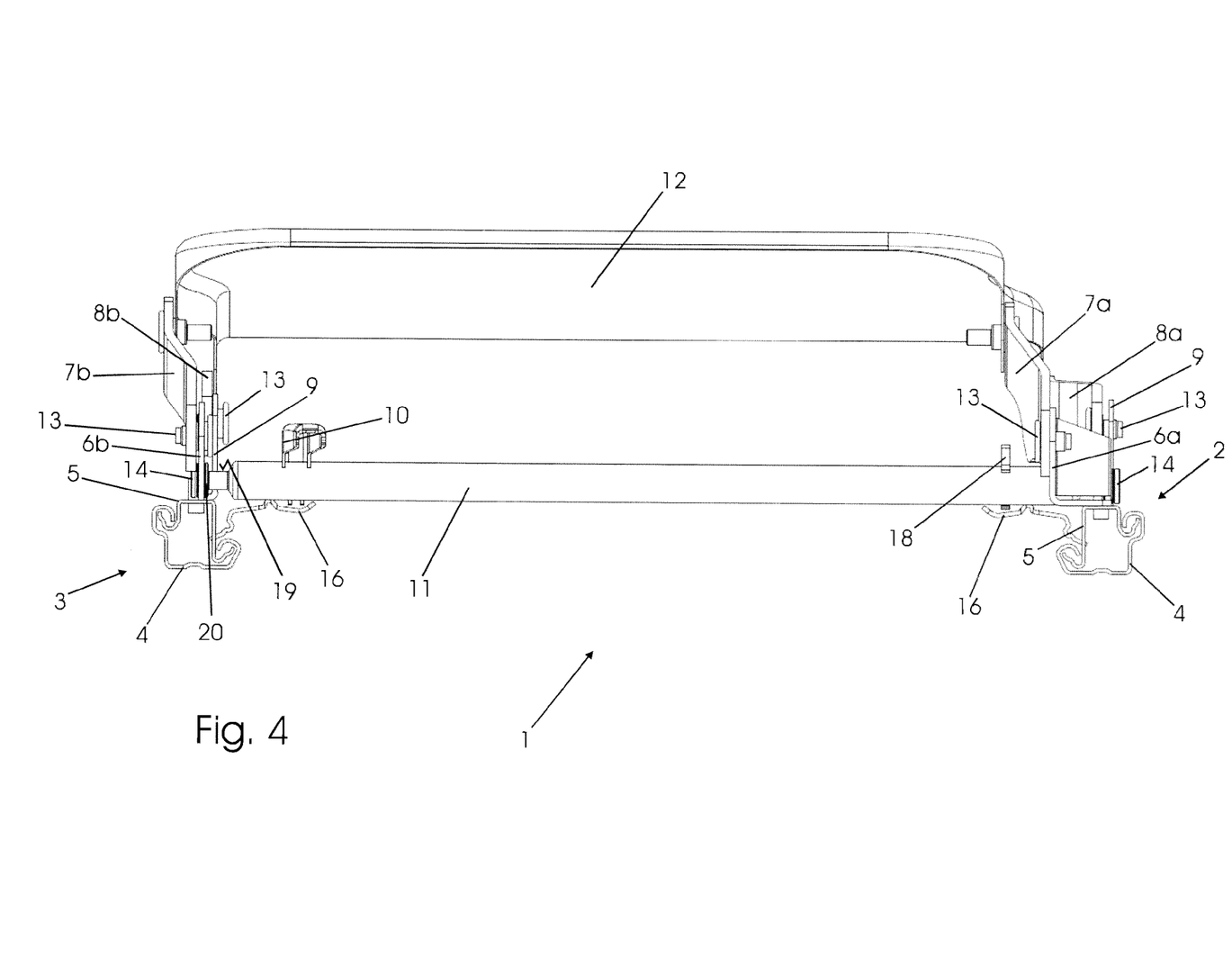
FIG. 4 shows a front view of the seat base frame in FIG. 1.

The mounting linkage holders 6a, 6b, 9 are fastened, preferably welded, on the upper rails 5. A design of the front mounting linkage holder 6a of the door-side pair of tracks 2 curved in the direction of the tunnel-side pair of tracks 3 in connection with a design of the front and rear mounting linkages 7a, 8a of the door-side pair of tracks 2 also bent in the direction of the tunnel-side pair of tracks 3 results in that the seat surface 12 is arranged asymmetrically with respect to the pairs of tracks 2, 3. This means, as can be seen in particular from FIG. 4, that the seat surface 12 is arranged displaced in the direction of the tunnel-side pair of tracks 3. The asymmetry is reinforced in that, although the front mounting linkage holder 6b of the tunnel-side pair of tracks 3 extends substantially perpendicular to the upper rails 5, the hinge point of the front mounting linkage 7b with the seat structure 12 is displaced in a direction facing away from the door-side pair of tracks 2 due to its bent designed analogously to the mounting linkage 7a. In the rear area of the pairs of tracks 2, 3, rear mounting linkage holders 9, which enable a jointed arrangement of the rear mounting linkages 8a, 8b, are arranged on the upper rails 5.

A locking device 15 is assigned to each pair of tracks 2, 3. The locking devices 15 thereby have locking pins 17 arranged displaceably on the upper rail 5, of which at least one locking pin 17 engages in one of several openings (not shown) in the lower rail 4 in a locked position and thus each upper rail 5 locks with respect to the lower rail 4.

The displacement of the locking device 15 out of the locked position into a release position, in which the locking pins 17 disengage from the lower rail 4, takes place via actuation elements 16 extending from the locking devices 15 in the direction of the opposite-lying pair of tracks 2, 3, the adjustment of which effectuates a displacement of the locking pins 17 in a disengaged position with the lower rail 4.

Figure 6:
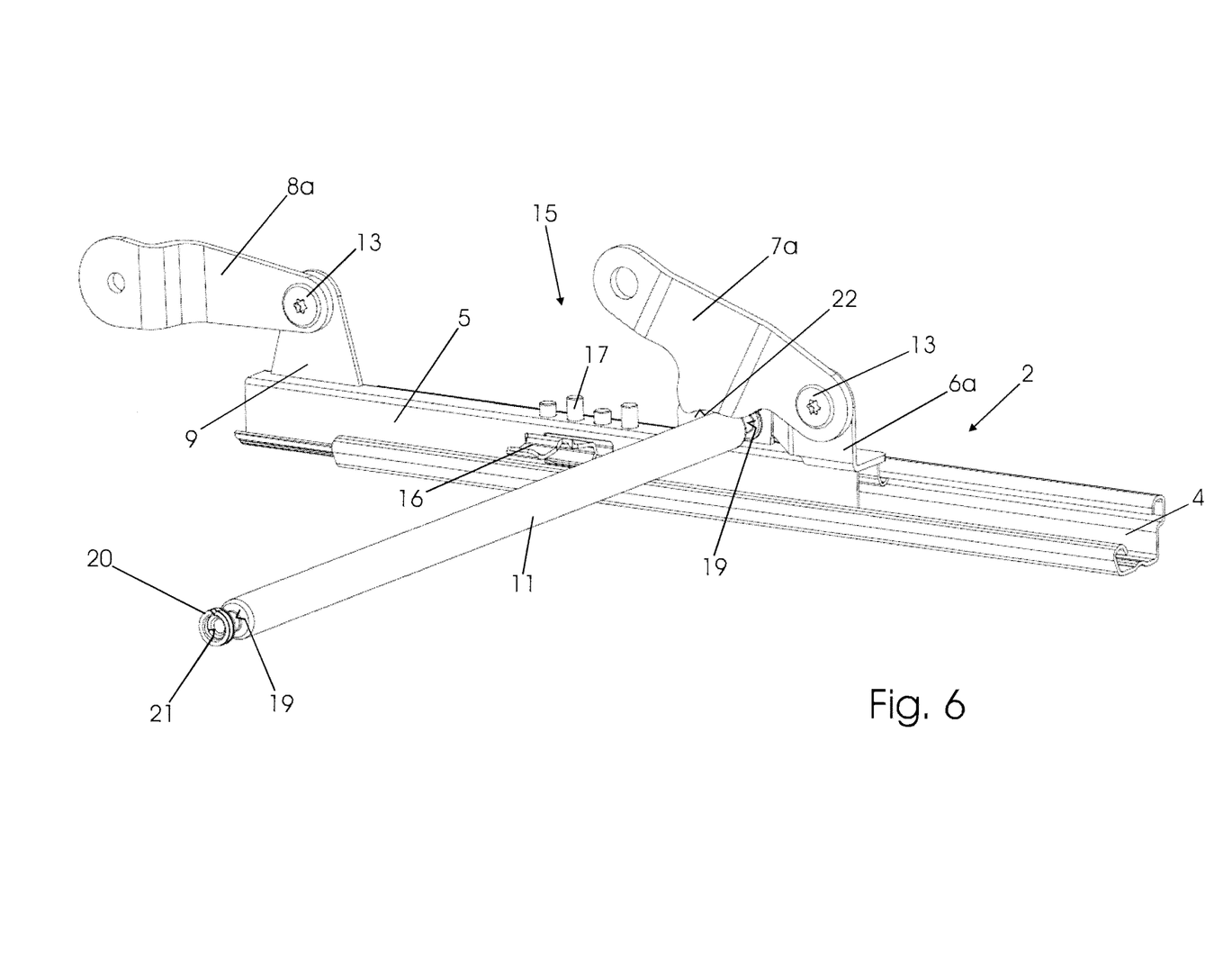
FIG. 6 shows a perspective view of a side rail of the seat base frame in FIG. 3 with the transverse support arranged on it and FIG. 7 shows an exploded representation of a connection of the transverse support in FIG. 1 with a mounting linkage holder.
Figure 7:
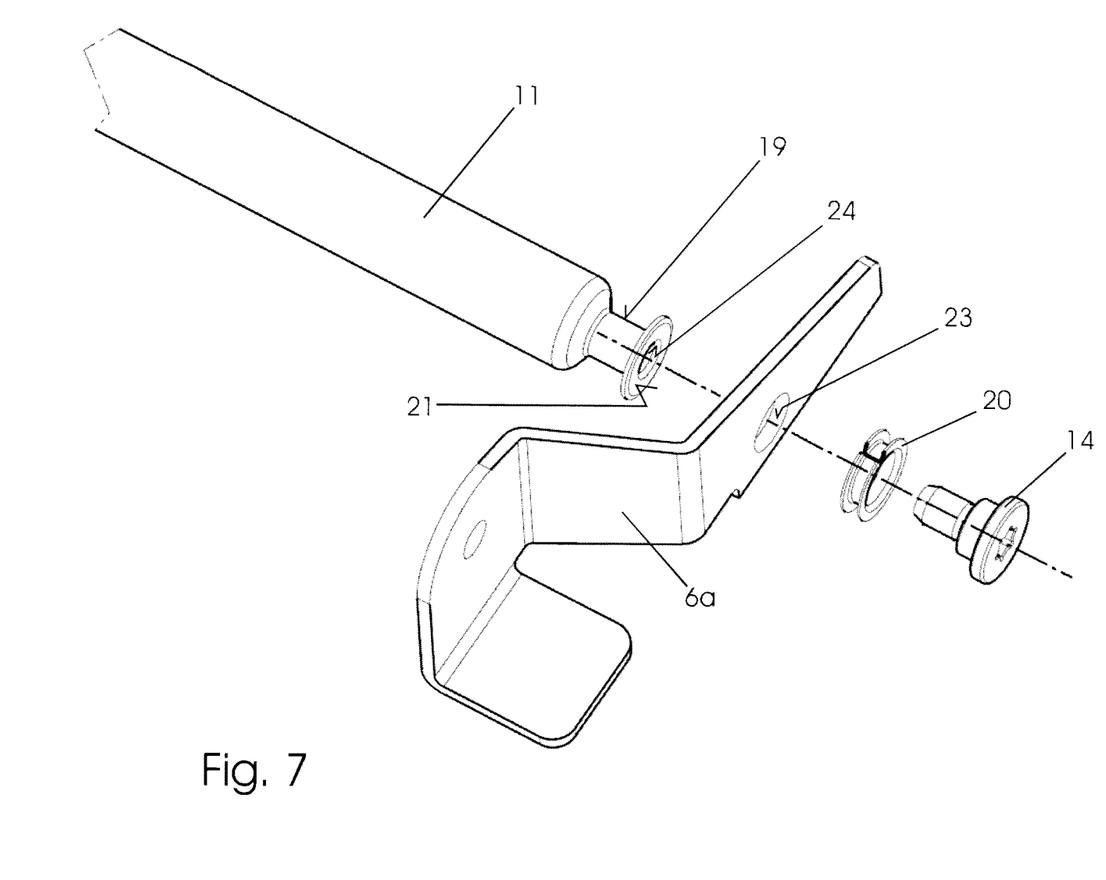

For the adjustment of the actuation elements 16 as well as for the axial supporting of the pairs of tracks 2, 3 with respect to each other, a cross tube 11extends between the front mounting linkage receivers 6a, 6b. The cross tube 11 rests with its front surfaces 21 connecting to tapers 19 on the facing inner surfaces of the mounting linkage receivers 6a, 6b and is thus fixed with respect to it in the axial direction of the cross tube 11. For the securing of the position and moreover for the rotatable arrangement with respect to the pairs of tracks 2, 3, the cross tube 11 is also fixed on the mounting linkage holders 6a, 6b via threaded bolts 14 extending through the mounting linkage holders 6a, 6b and screwed into front-side thread openings 24 of the cross tube 11. For the pivot-mounting, the threaded bolts 14 with a thread-free section thereby extend through an opening 23 in the mounting linkage receivers 6a, 6b (see FIGS. 6 and 7) provided with a bushing 20. The arrangement of the cross tube 11 on the front mounting linkage holders 6a, 6b is thus such that the cross tube 11 is rotatably mounted fixed in the axial direction with respect to the pairs of tracks 2, 3.

The rotatable mounting of the cross tube 11 makes it possible to use it to actuate the locking devices 15. For this, an actuating lever 10 is welded to the cross tube 11 in the area of one end of the cross tube 11, in the exemplary embodiment in the area of the tunnel-side pair of tracks 3. The actuating lever 10 extends from a front area accessible to a user over the cross tube 11 parallel to the pair of tracks 3 up to into an engagement area with the actuation element 16 of the locking device 15 of the tunnel-side pair of tracks 3. A raising of the front end of the actuating lever 10 causes a rotation of the cross tube 11, wherein the rear end of the actuating lever 10 lying opposite the front end and assigned to the locking device 15 engages with the actuating element 16 and displaces it into a release position, in which the locking pins 17 disengage from the lower rail 4.

A transfer of the actuation movement of the actuating lever 10, which results in a rotational movement of the cross tube 11, to the locking device 15 assigned to the door-side pair of tracks 2 takes place via a control lever 18. It extends in the area of the door-side pair of tracks 2 from the cross tube 11 up to into an engagement area with the actuation element 16 of the locking device 15 assigned to the door-side pair of tracks 2. As a result of the rotational movement of the cross tube 11 brought about by an actuation of the actuating lever 10, an adjustment of the locking pins 17 of the locking device 15 assigned to the door-side pair of tracks 2 into a disengaged position with the bottom rail 4 also takes place through the interaction of the control lever 18 with the actuation element 16. As a result of the adjustment that then took place on both locking devices 15 into a release position, a longitudinal adjustment of the seat surface 12 is possible through a displacement of the upper rails 5 relative to the lower rails 4. After reaching the desired longitudinal adjustment, the locking devices 15 arrive at their locked position preferably spring-pretensioned as a result of a no longer present actuation of the actuating lever 10.

Figure 3:
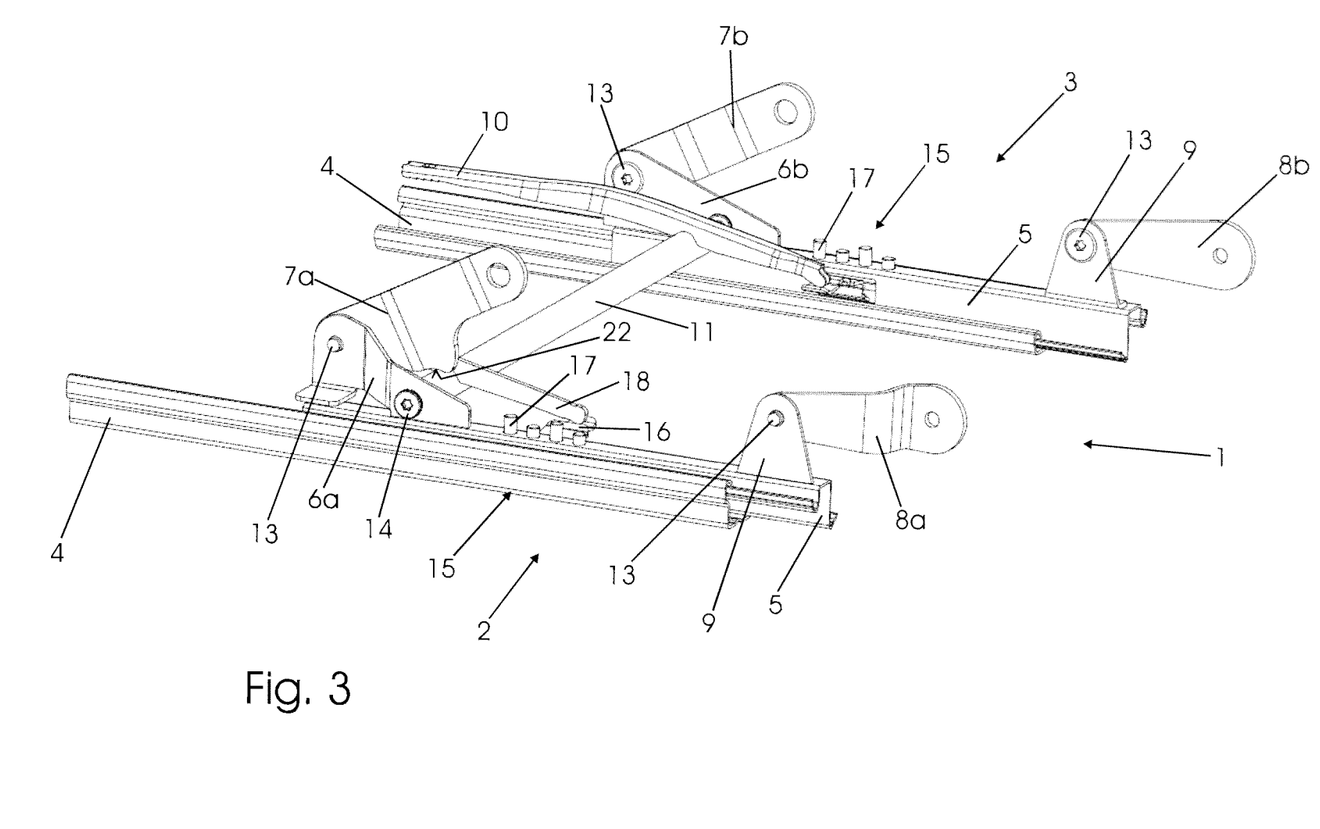
FIG. 3 shows a perspective view of the seat base frame in FIG. 1 without the seat structure arranged on it.
Figure 5:
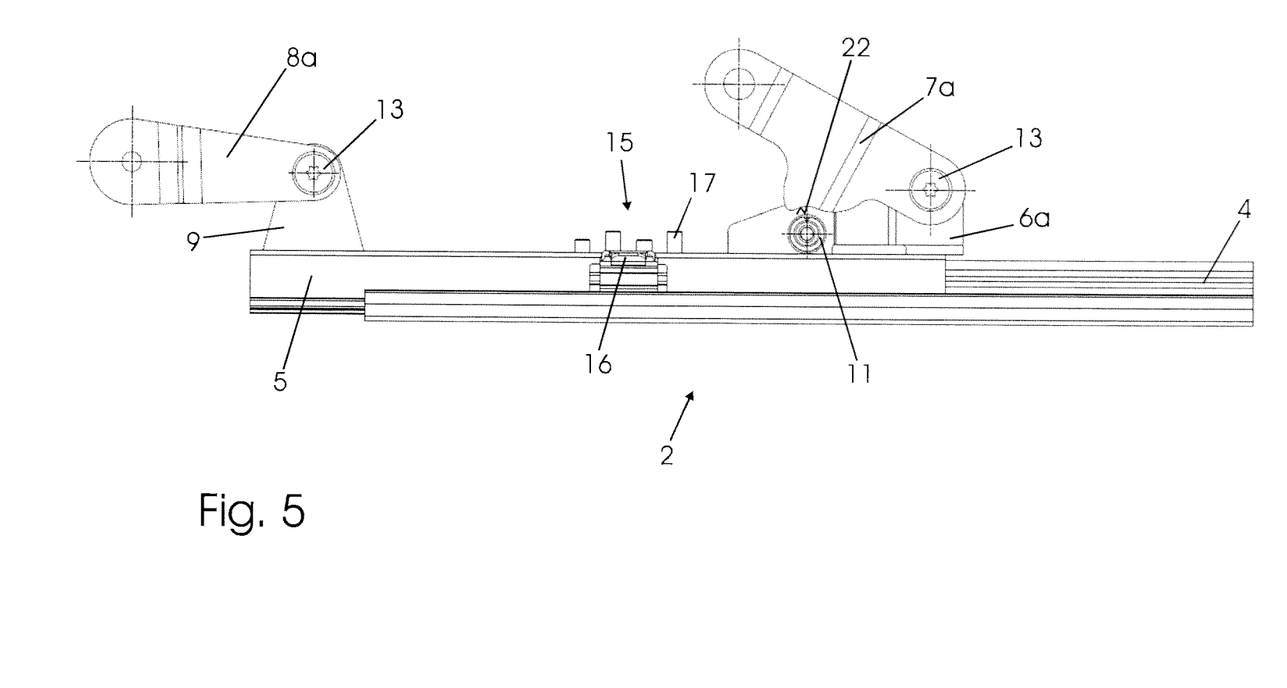
FIG. 5 shows a side view of a pair of tracks of the seat base frame in FIG. 3.

For the fixation of a maximally lowered position of the seat surface 12, which is height-adjustable via the mounting linkages 7a, 7b, 8a, 8b, the front mounting linkage 7a of the door-side pair of tracks 2 is connected with the front mounting linkage holder 6a such that the cross tube 11 is located in the pivoting range of the front mounting linkage 7a. The maximally lowered position of the seat surface 12 is determined by the front mounting linkage 7a abutting on the cross tube 11, wherein in this position a contact surface 22 of the mounting linkage 7a rests on the cross tube 11. The contact surface 22 is thereby adjusted to its contour for establishing a two-dimensional abutting on the cross bar 11 (see FIGS. 3 to 5).

The invention claimed is:

1. A seat base frame for a motor vehicle seat comprising:
a parallel pair of tracks extending in a longitudinal direction and spaced apart from each other in a latitudinal direction,
wherein each track has an upper rail and a lower rail,
wherein the upper rails are movable in the longitudinal direction relative to the lower rails;
locking devices, each of the lower rails having one of the locking devices mounted thereon and configured to lock the upper rail relative to the lower rail in a locked position to prevent movement of the upper rail in the longitudinal direction, and configured to release the upper rail relative to the lower rail in a release position to allow movement of the upper rail relative to the lower rail in the longitudinal direction,
wherein the upper rails are configured to connect to a seat structure;
mounting linkage holders, each of the upper rails having one of the mounting linkage holders attached thereto;
a transverse support extending in an axial direction that is substantially perpendicular to the upper rails,
wherein each end of the transverse support is attached to a respective one of the mounting linkage holders,
wherein the transverse support fixes the parallel pair of tracks together in the axial direction such that collapse of the seat base frame in the event of a car crash is prevented by the transverse support,
wherein the transverse support is rotatable about the axial direction relative to the upper rails and the mounting linkage holders,
wherein the transverse support is fixed in the longitudinal direction relative to the mounting linkage holders;
an actuating lever attached to the transverse support;
a control lever attached to the transverse support and spaced apart from the actuating lever in the latitudinal direction,
wherein the actuating lever and the control lever are attached to the transverse support such that the actuating lever and the control lever are rotatably fixed relative to one another,
wherein the actuating lever and the control lever are each engageable with a respective one of the locking devices to move the locking devices between the locked position and the release position; and
mounting linkages, each of the mounting linkage holders having one of the mounting linkages pivotably attached thereto,
wherein the mounting linkages are at least one of a front mounting linkage and a rear mounting linkage.

2. The seat base frame according to claim 1, wherein the parallel pair of tracks include a door-side track and a vehicle-center track, wherein the mounting linkages of the door-side track and the vehicle-center track have a different geometry.

3. The seat base frame for a motor vehicle seat according to claim 1, wherein at least one front mounting linkage is engageable with the transverse support.

4. The seat base frame according to claim 3, wherein the front mounting linkage engageable with the transverse support has a contact surface, wherein a contour of the contact surface matches a contour of the transverse support.

5. The seat base frame according to claim 1, wherein the transverse support is a cross tube.

6. The seat base frame according to claim 1, wherein an end surface of each end of the transverse support abuts the respective one of the mounting linkage holders.

7. The seat base frame according to claim 1, wherein the actuating lever and the control lever are welded on the transverse support.

8. The seat base frame according to claim 1, wherein the mounting linkage holders are front mounting linkage holders.

9. The seat base frame according to claim 2, wherein the seat structure is arranged asymmetrically to the parallel pair of tracks.

10. The seat base frame according to claim 9, wherein a seat pan is arranged asymmetrically to the parallel pair of tracks.

11. The seat base frame according to claim 6, wherein the end surface of each end of the transverse support abuts an inner surface of the respective one of the mounting linkage holders.

12. The seat base frame according to claim 7, wherein the actuating lever and the control lever are laser-welded on the transverse support.

* * * * *